United States Patent
Schiavon et al.

(10) Patent No.: US 12,269,232 B2
(45) Date of Patent: Apr. 8, 2025

(54) PROCESS FOR MANUFACTURING A BICYCLE SADDLE

(71) Applicant: SELLE SMP S.A.S. DI FRANCO SCHIAVON, Padua (IT)

(72) Inventors: Franco Schiavon, Padua (IT); Maurizio Schiavon, Padua (IT)

(73) Assignee: SELLE SMP S.A.S. DI FRANCO SCHIAVON, Padua (IT)

( * ) Notice: Subject to any disclaimer, the term of this patent is extended or adjusted under 35 U.S.C. 154(b) by 106 days.

(21) Appl. No.: 17/926,048

(22) PCT Filed: Jun. 3, 2021

(86) PCT No.: PCT/EP2021/064907
§ 371 (c)(1),
(2) Date: Nov. 17, 2022

(87) PCT Pub. No.: WO2021/245189
PCT Pub. Date: Dec. 9, 2021

(65) Prior Publication Data
US 2023/0182427 A1  Jun. 15, 2023

(30) Foreign Application Priority Data

Jun. 4, 2020  (IT) .......................... 102020000013249

(51) Int. Cl.
| | |
|---|---|
| *B29D 99/00* | (2010.01) |
| *B62J 1/00* | (2006.01) |
| *B62J 1/18* | (2006.01) |
| *B29K 75/00* | (2006.01) |
| *B29K 105/04* | (2006.01) |

(52) U.S. Cl.
CPC .......... *B29D 99/0092* (2013.01); *B62J 1/002* (2013.01); *B62J 1/18* (2013.01); *B29K 2075/00* (2013.01); *B29K 2105/04* (2013.01)

(58) Field of Classification Search
CPC ...... B29D 99/0092; B29C 63/025; B62J 1/00; B62J 1/002; B62J 1/18; B29K 2075/00
USPC ..................................................... 297/215.16
See application file for complete search history.

(56) References Cited

U.S. PATENT DOCUMENTS

| | | | |
|---|---|---|---|
| 3,586,369 A | 6/1971 | Worley | |
| 5,356,205 A | 10/1994 | Calvert et al. | |
| 6,106,059 A * | 8/2000 | Minkow | ............... B62J 1/26 |
| | | | 297/202 |
| 6,110,311 A | 8/2000 | Mayle et al. | |

(Continued)

FOREIGN PATENT DOCUMENTS

| | | | | |
|---|---|---|---|---|
| DE | 20213536 | | 1/2004 | |
| EP | 4074487 A1 | * | 10/2022 | ....... B29C 45/14467 |
| JP | H02119890 | | 5/1990 | |

*Primary Examiner* — Jose V Chen
(74) *Attorney, Agent, or Firm* — DUANE MORRIS LLP; Gregory M. Lefkowitz; Joaquin Hernandez

(57) ABSTRACT

This disclosure is directed to the manufacturing of bicycle saddles. For instance, in some examples, a process to manufacture a bicycle saddle provides a central through channel as well as a hull with a through hole, a polyurethane layer as a padding element, and a liner adapted to cover the polyurethane layer. The process allows for the manufacturing of bicycle saddles that have various significant advantages over prior art bicycle saddles, including advantages from both an aesthetic and functional point of view of a user.

8 Claims, 17 Drawing Sheets

(56) References Cited

U.S. PATENT DOCUMENTS

| | | |
|---|---|---|
| 6,139,097 A | 10/2000 | Yates |
| 11,352,086 B2 | 6/2022 | Schiavon |
| 2003/0025364 A1 | 2/2003 | Antonio |
| 2006/0152047 A1 | 7/2006 | Riondato |
| 2007/0200399 A1 | 8/2007 | Riondato |
| 2007/0246977 A1 | 10/2007 | Riondato |
| 2009/0079237 A1 | 3/2009 | Riondato |
| 2013/0313870 A1 | 11/2013 | Riondato |
| 2014/0070576 A1* | 3/2014 | Wu .............. B62J 1/00 297/214 |
| 2015/0130234 A1* | 5/2015 | Bailie .......... B62J 1/18 297/214 |
| 2016/0137245 A1 | 5/2016 | Schiavon |
| 2016/0368554 A1* | 12/2016 | Rizzato ............ B62J 1/002 |
| 2017/0036724 A1 | 2/2017 | Yu |
| 2018/0186420 A1* | 7/2018 | Yu .............. B62J 1/005 |
| 2018/0290703 A1* | 10/2018 | Li .............. B62J 1/002 |
| 2019/0061850 A1* | 2/2019 | Sung ............ B62J 1/002 |
| 2019/0185089 A1* | 6/2019 | Pruitt .......... B62J 1/007 |
| 2021/0114677 A1* | 4/2021 | Perotto .......... B29C 45/14631 |
| 2022/0041233 A1* | 2/2022 | Hohmuth .......... A61B 8/4209 |
| 2022/0048585 A1* | 2/2022 | Bigolin .......... B62J 1/005 |
| 2022/0355878 A1* | 11/2022 | Kim ............ B62J 1/007 |

* cited by examiner

STATE OF THE ART

STATE OF THE ART

STATE OF THE ART

STATE OF THE ART

STATE OF THE ART

STATE OF THE ART

STATE OF THE ART

STATE OF THE ART

STATE OF THE ART

STATE OF THE ART

STATE OF THE ART

STATE OF THE ART

PROCESS FOR MANUFACTURING A BICYCLE SADDLE

CROSS-REFERENCE TO RELATED APPLICATIONS

This application is a § 371 national stage entry of International Application No. PCT/EP2021/064907, filed Jun. 3, 2021, which claims priority to Italian Patent Application No. 102020000013249, filed Jun. 4, 2020, the entire contents of which are incorporated herein by reference.

The present invention relates to a process for manufacturing a bicycle saddle according to, the general part of claim 1. The invention also relates to a bicycle saddle obtained by the process set forth in the invention.

In the field of bicycle saddles, those with a central through channel at their median portion are becoming increasingly popular. These saddles are particularly shaped to provide maximum comfort to a person who uses them for recreational, amateur and sports purposes, for more or less prolonged periods. In fact, it is well known that one of to the problems encountered With the use of bicycle saddles is that due to the discomfort that the cyclist encounters when using the bicycle for considerable periods of time that, in some cases, can even reach several hours. Therefore, saddle manufacturers, in an attempt to overcome this drawback, have made saddles that have this central channel and that are shaped in a particular way so as to place the ischial tuberosities of the user on the portions close to this channel, while the sexual organs of the person, especially male, but also female ones, tend to be placed inside said channel.

Within this category of saddles those of the owner of the present, application must be included, who boasts a considerable number of patents in this field among which those described in the following European documents must be included:

EP1590229, EP 1778537, EP 1781528, EP2029417, EP2673183 and EP3022110.

Such saddles provide a central through channel and which have, in particular:
- a hull with a through hole at said central channel;
- a polyurethane layer as a padding element;
- a liner adapted to cover said polyurethane layer.

The most important state-of-the-art document is WO 2019/106449 A1 (relating to an international patent application the owner of which is the same applicant of the present application), in which the following process is set out (references in brackets are to the document mentioned above):

Process for manufacturing a bicycle saddle (page 1, lines 7 and 8), which provides a central channel (see FIG. 5: the channel between the paddings P) and which has:
- a hull (S) with a through hole (see FIG. 5: the hole between both shells of the hull S) at the central channel of the saddle:
- a polyurethane lave (see page 7, line 12: the padding P is made of PU) as a padding element (P);
- a liner (C) adapted to cover (see FIG. 5) the polyurethane layer (P), said process providing for the following steps:
- arranging (see FIG. 4) the liner (C) on the hollow surface of a mould (M20);
- creating a vacuum (through the M23 ducts) between the liner (C) and said hollow surface to allow a perfect adhesion (see FIG. 4) between the aforesaid ones;
- pouring polyurethane (see page 8, line 5) into said hollow surface, previously covered by the liner (C);
- positioning (see page 8, lines 5 and 6) of the hull (S) on the surface of a counter mould (M22);
- mutual approaching and closing (see page 8, line 6) of the mould (M20) and counter mould (M22) and consequent positioning (see FIG. 5) of the counter mould (M22) at the hollow surface of the mould (M20);
- expansion (see page 8, line 6) of the polyurethane, which completely fills (see FIG. 5) the space between the liner (C) and the hull (S);
- mutual moving away (implied) of mould (M20) and counter mould (M22);
- extraction (implied) of the set of bull (S), polyurethane (P) and liner (C) of the mould (M20), wherein said liner (C) is subjected to a previous processing step so as to present a cap-like structure (see FIGS. 1 and 2: before the finished liner C is placed on the second mould M2, a cap-like structure is created in the unfinished liner C1 by means of a first mould M1) at the region (compare the liner C in FIGS. 2 and 4) in which the channel (see FIG. 5: the channel between the paddings P) of the saddle will be present once formed and in which the step of arranging the liner (C) presenting the cap-like structure (see FIG. 3) on the mould (M20) takes place taking care to arrange said cap-like structure on a projection (see FIGS. 2 and 4: the cap-like structure formed in the mould M10 is positioned on the projection of the mould M20), specifically provided in said mould (M20), adapted to engage with a concavity (see FIG. 5: between the shells of the hull S) specifically provided in said counter mould (M22).

Other state-of-the-art documents are cited below: U.S. Pat. No. 5,356,205A, EP1281607A1 and DE20213536U1.

This process is well known and has been carried out for some years in a particularly reliable way, resulting in particularly satisfactory embodiments, both from the production point of view and from the functional one in favour of the user.

However, it must be considered that, in itself, the liner constitutes a flat-shaped element; moreover, given the particular methods for the application of the liner, with the state-of-the-art processes a coverage of the central through channel is also generated. It is clear that this portion covering the channel must be removed. This necessarily involves cutting off this excess portion and consequently forming an edge around said central channel passing at the contact region between the polyurethane layer and the liner. This edge is extremely thin but is still noticeable to the touch. It must also be considered that very often the bicycle saddles that belong to this type have a very high cost of sale, which can reach several hundred euros, and then the presence of this edge, even only for aesthetic reasons, is annoying for the user. Moreover, it is clearly unpleasant for the user's touch to find the presence of such an edge. In principle, it is therefore wished to ensure that the surface of the central channel be perfectly smooth in an object having such a rather high cost, but this is impossible with the state-of-the-art processes.

The main object of the present invention is precisely that of realising a process for manufacturing a bicycle saddle providing a central through channel, which has the steps previously described in detail and finally resulting in a bicycle saddle in which the edge of the central through channel is perfectly smooth, which allows to overcome the above-mentioned drawback.

A further object of the invention is to ensure that such a process is simple and does not require special technologies and mechanisms for its implementation.

Still, a further object of the invention is to realise such a process involving costs comparable to those of similar processes of a known type, both as regards the equipment used and the materials used to create the saddle.

The present invention also proposes manufacturing a bicycle saddle providing a central through channel which is completely devoid of the aforementioned edge at said channel.

This is achieved by a process according to the characterizing part of claim 1. Further features of this process are present in the dependent claims. The invention also relates to a saddle manufactured by means of such processes.

These and other feature of the invention will now be described herein in detail, in some particular embodiments thereof, with reference to the accompanying drawings, wherein.

Figure 13:
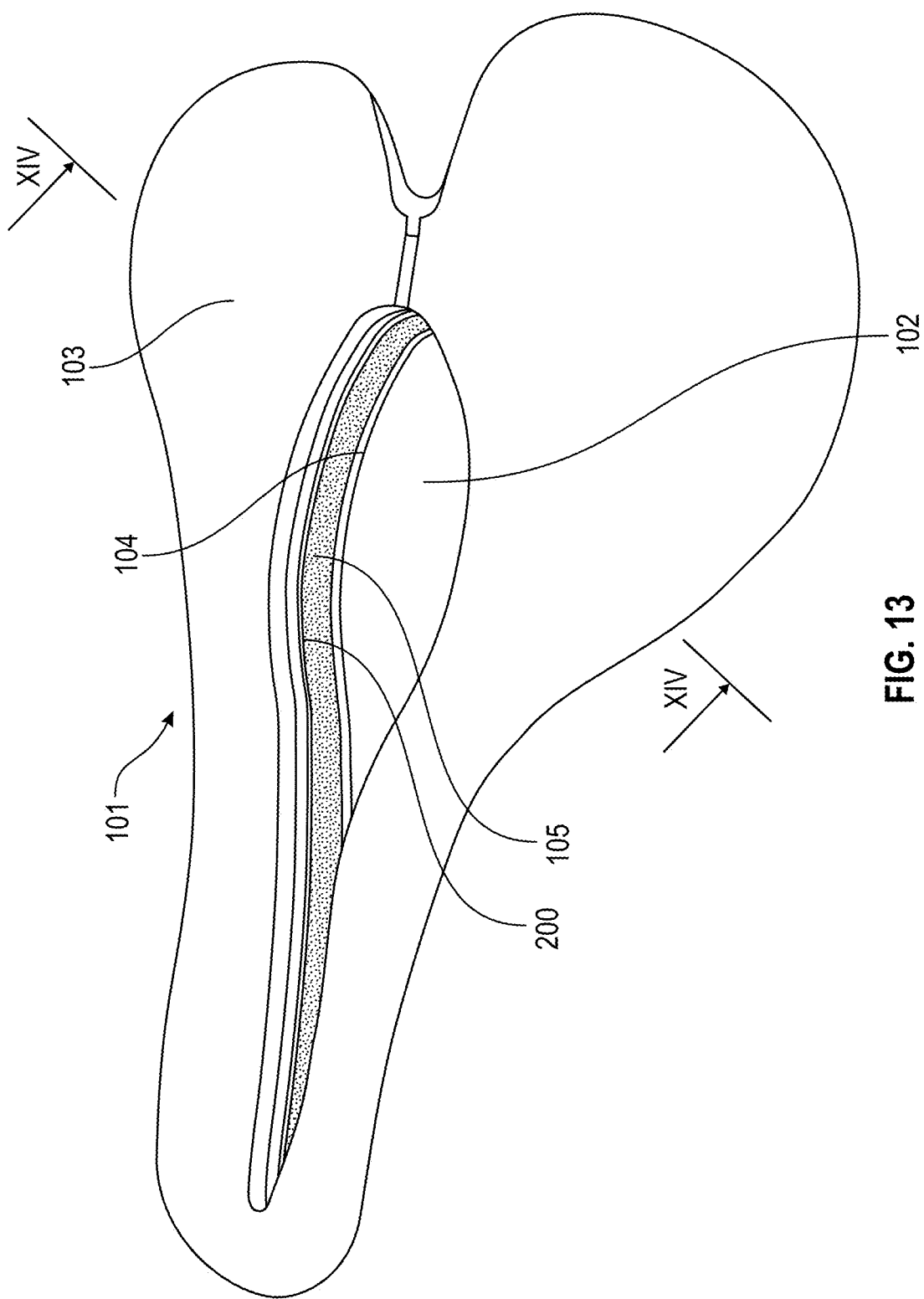
FIG. 13 shows a perspective view of a saddle with a central channel belonging to the state of the are.
Figure 14:
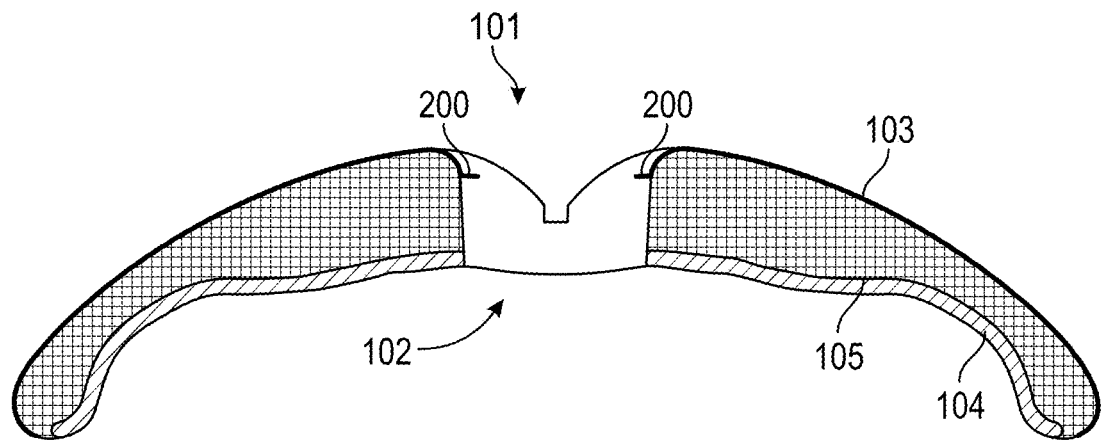
FIG. 14 shows a cross-sectional view of the aforesaid one, carried out according to line XIV-XIV of FIG. 13.
Figure 26:
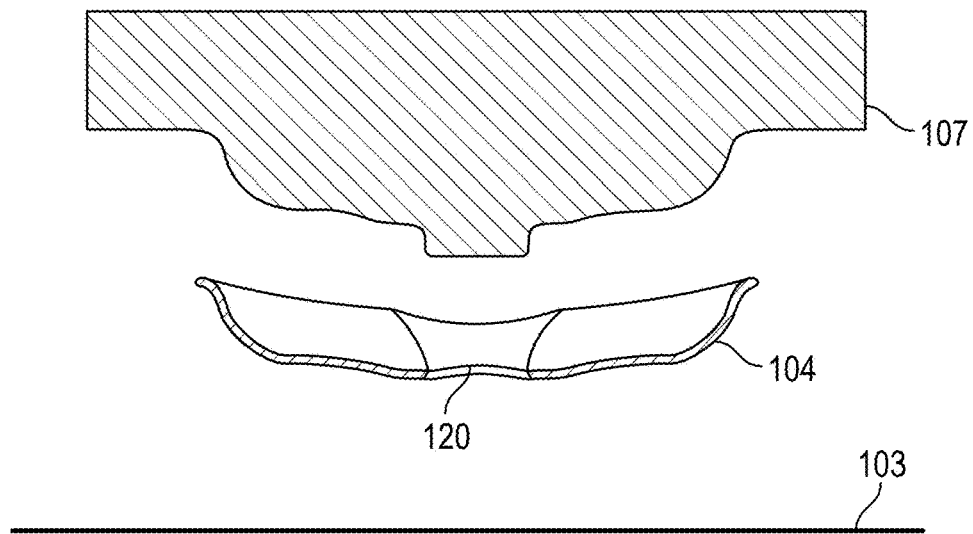
FIGS. 26 to 34 show views of various elements involved in the process for manufacturing a saddle with a central channel according to the state of the art, which correspond, respectively, to the views in FIGS. 4 to 12, relative to the process referred to in the invention.
Figure 26:
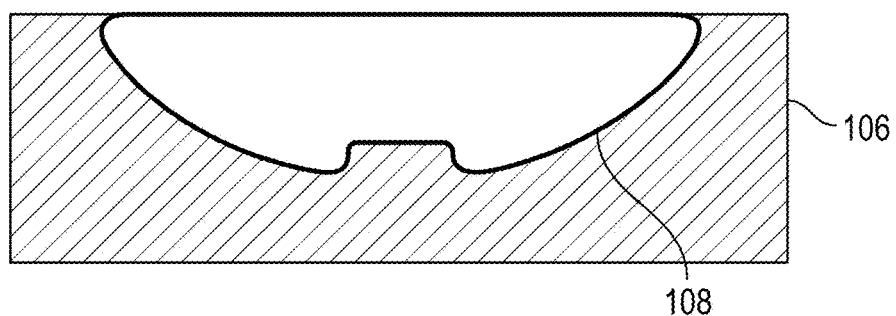

As can be seen in FIGS. 13 and 14, the state-of-the-art bicycle saddles 101 with a central through channel 102 are substantially composed of a hull 104 provided with a through hole 120 (FIG. 26) at the region that will be occupied by the central channel 102, by a polyurethane layer 105 having a padding function and by a liner 103 covering said layer. The liner 103 is usually made of synthetic material but can also be made of animal-derived materials such as leather or fabric.

The hull 104 is usually made of plastic material, but may also be made of metal, as well as carbon or in any case a material that provides adequate strength and solidity to the saddle.

Figure 27:
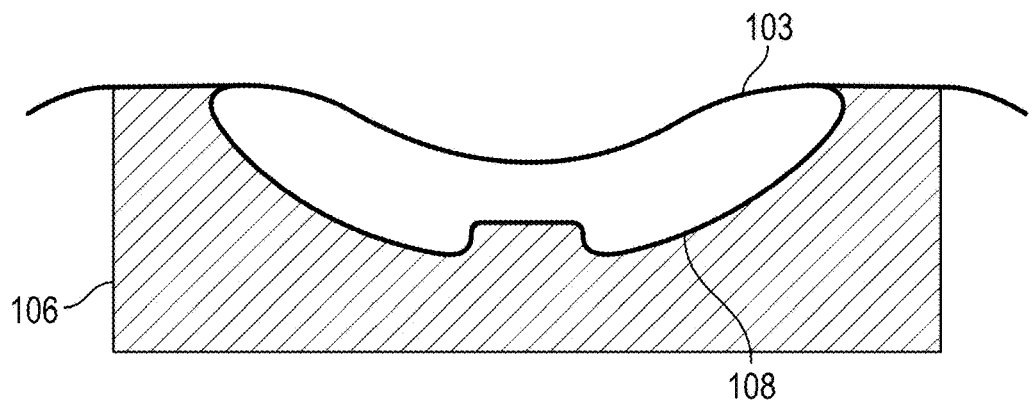
Figure 28:
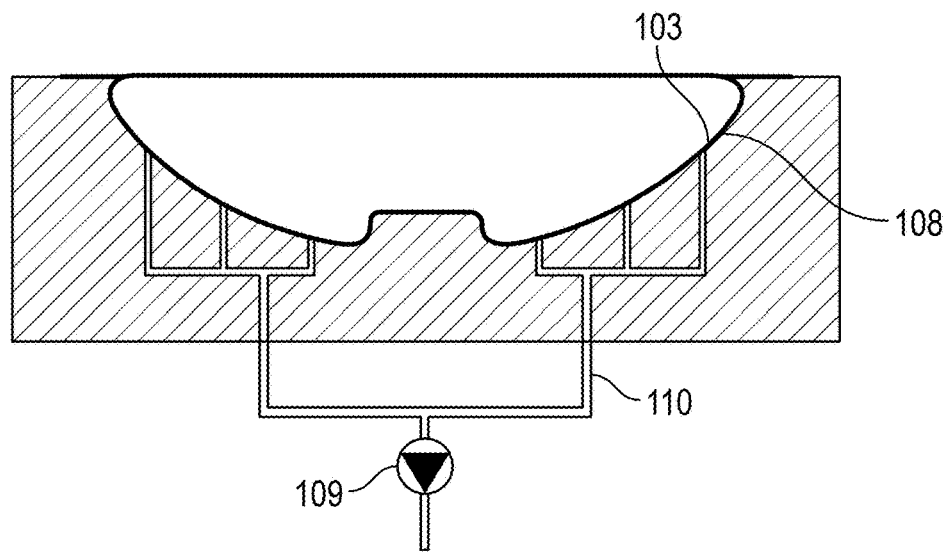
Figure 29:
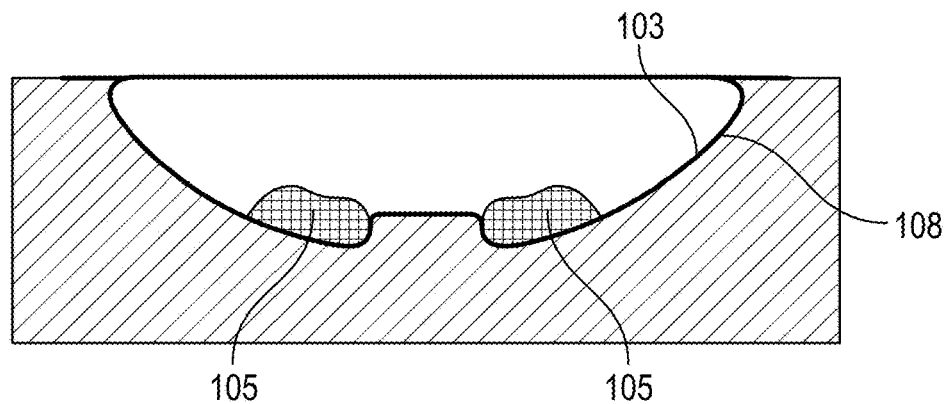
Figure 30:
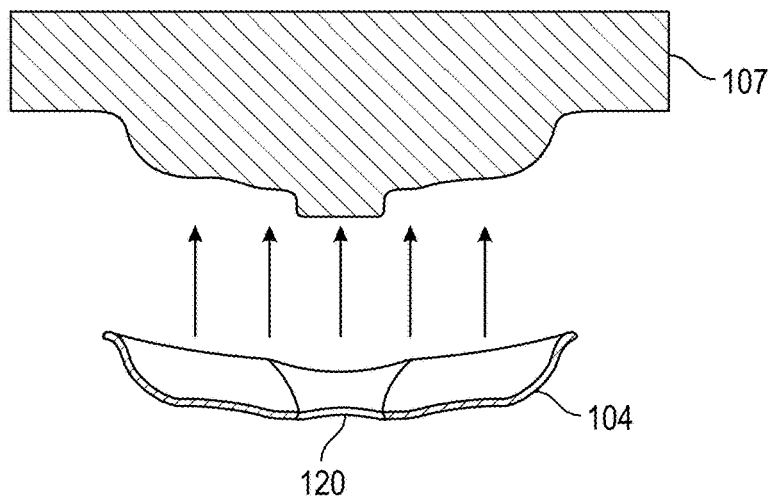
Figure 31:
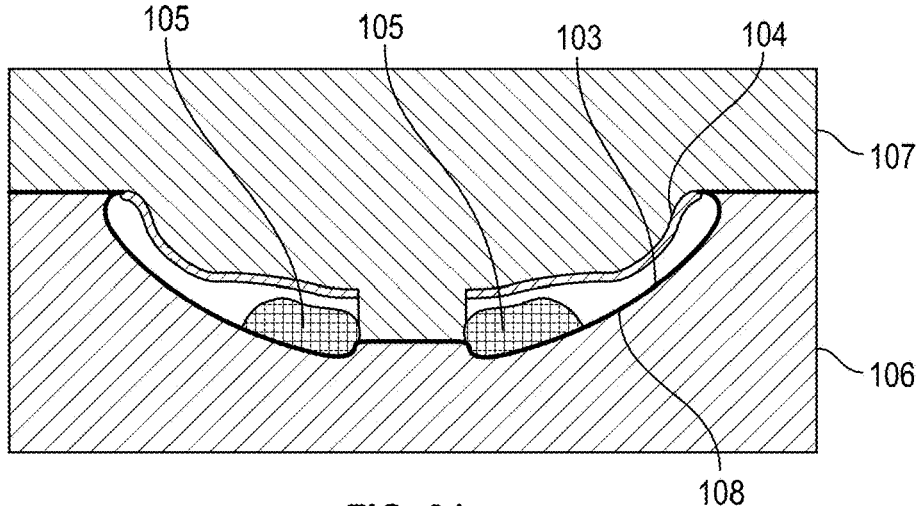
Figure 32:
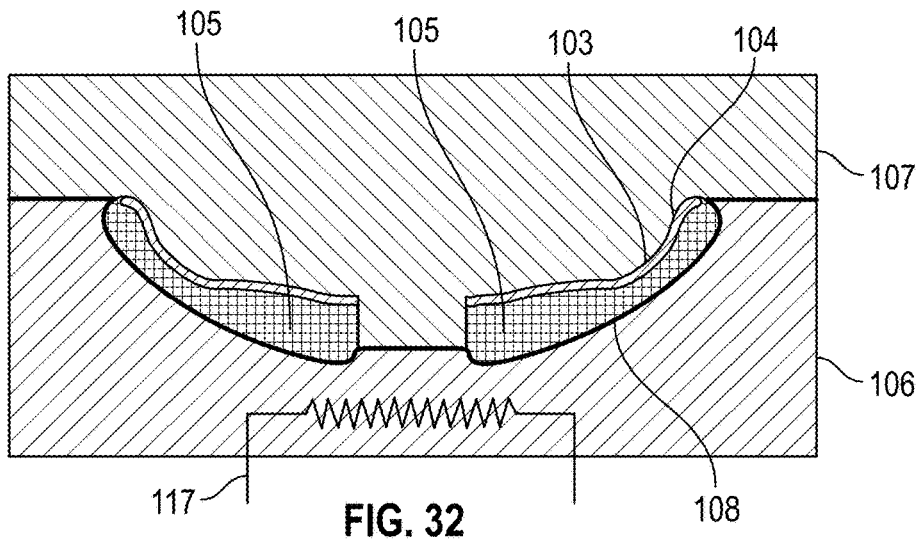
Figure 33:
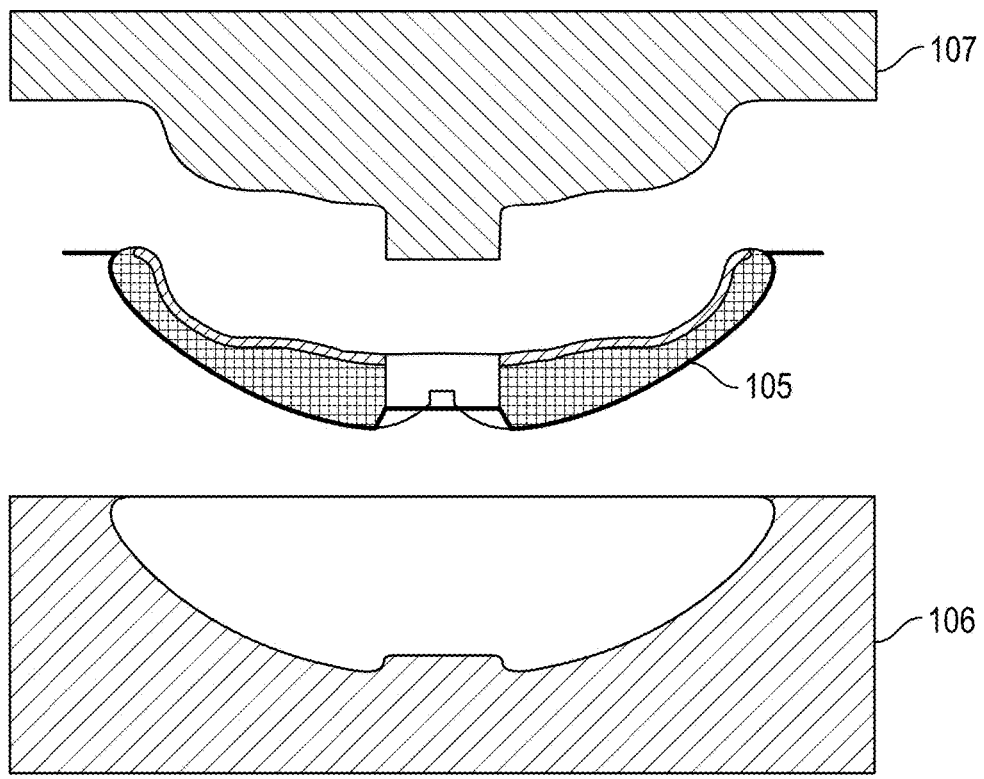
Figure 34:
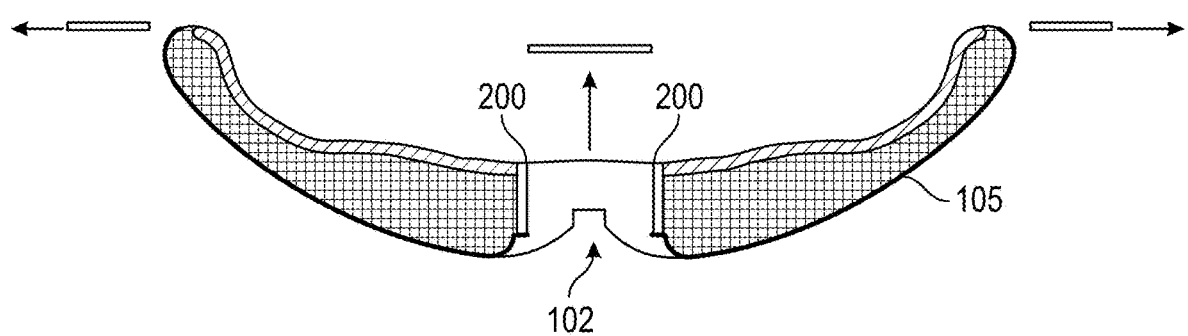

Said saddle 101 is usually assembled by a process (FIGS. 26-34) comprising the steps of:

arranging the liner 103 on the hollow surface 108 of a mould 106 (FIG. 27);

creating a vacuum between said liner 103 and said hollow surface 108 (FIG. 28) by suitable means, such as vacuum pumps 109, with pipes 110 connecting them to said hollow surface 108, to allow a perfect adhesion between the aforesaid ones. By vacuum the person skilled in the art means a pressure substantially lower than atmospheric pressure, but still sufficient to allow said perfect adhesion;

pouring polyurethane 105 into the hollow surface 108, previously covered by the liner 103 (FIG. 29);

positioning the hull 104 on the surface of a counter mould 107 (FIG. 30);

mutual approaching and closing of the mould 106 and counter mould 107 and consequent positioning of the counter mould 107 at the hollow surface 108 of the mould 106 (FIG. 31);

expansion of the polyurethane 105, which completely fills the space between the liner 103 and the hull 104 (FIG. 32). As is well known, polyurethane is a very versatile polymer which, in order to be used in the present invention, before being poured into the mould 106 above the liner 103, should be stored in liquid form inside containers, together with a propellant which at this pressure will also be in liquid form. When the mixture leaves the mixing container under pressure, the propellant will change to gaseous form, generating bubbles that will lead to the perceptible expansion of the polyurethane.

Figure 3:
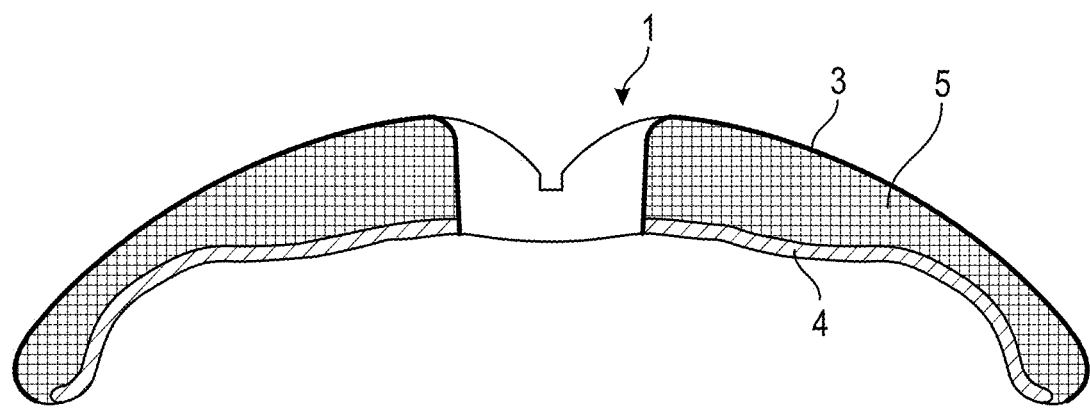
FIG. 3 shows a cross-sectional view of said saddle, carried out according to line III-III of FIG. 1.
Figure 4:
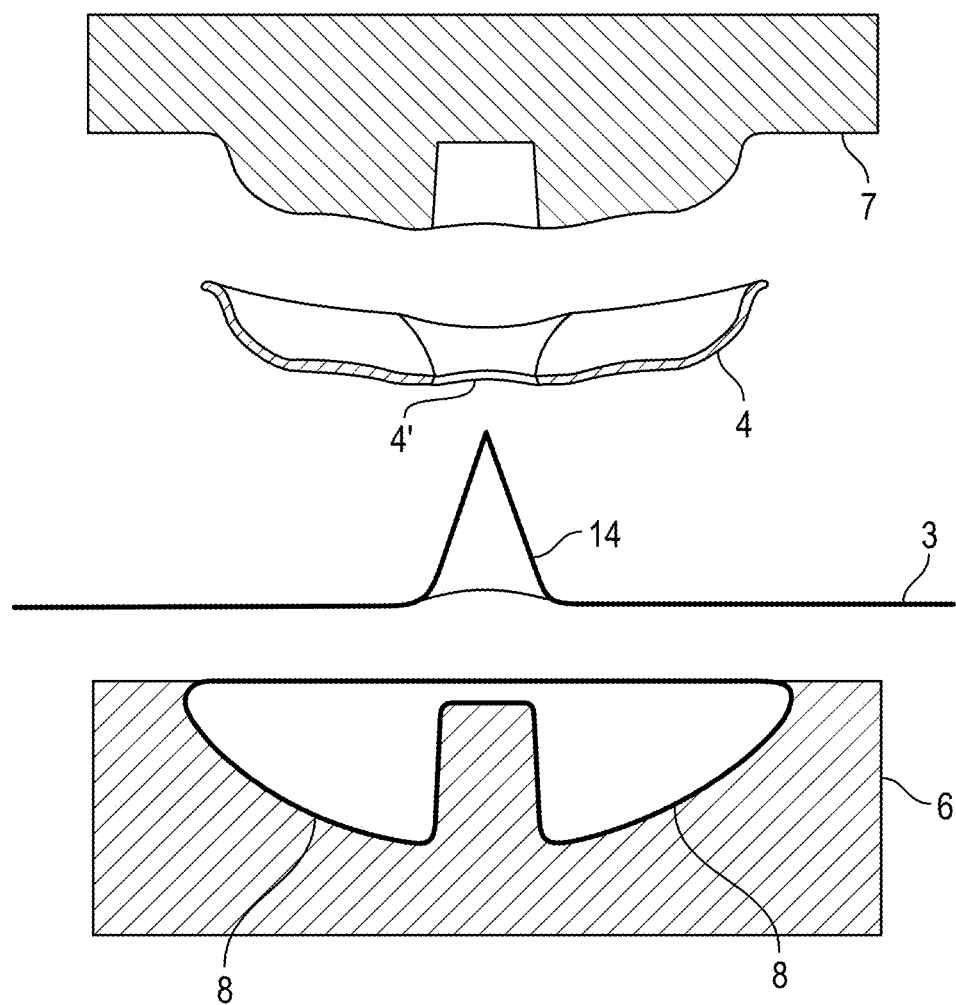
FIG. 4 shows, in a cross-sectional view the mould and the counter mould used during the process referred to in the invention, as well as other elements making up the saddle and also the liner and the hull, which will be further elements of the saddle referred to in the invention.
Figure 5:
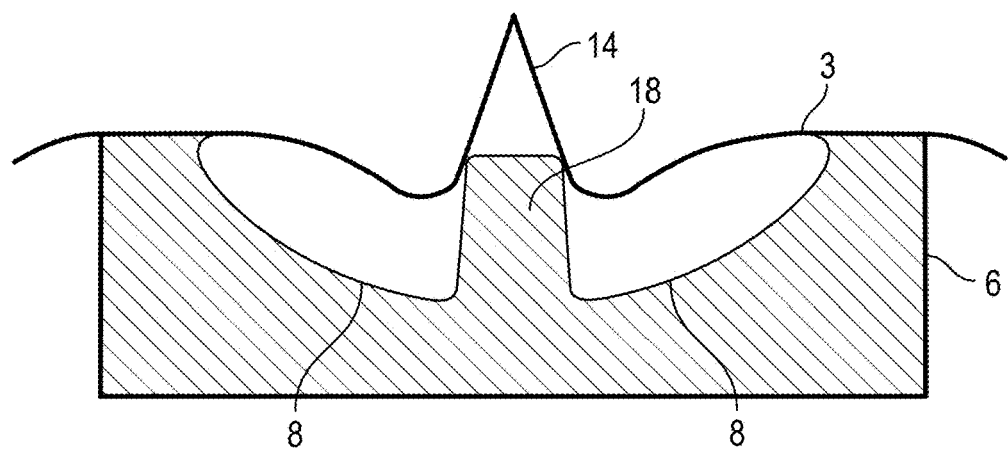
FIGS. 5, 6 and 7 show a cross-sectional view of the mould used in the process referred to in the invention, in three different steps, in which the liner used for manufacturing the saddle referred to in the invention is also shown.
Figure 6:
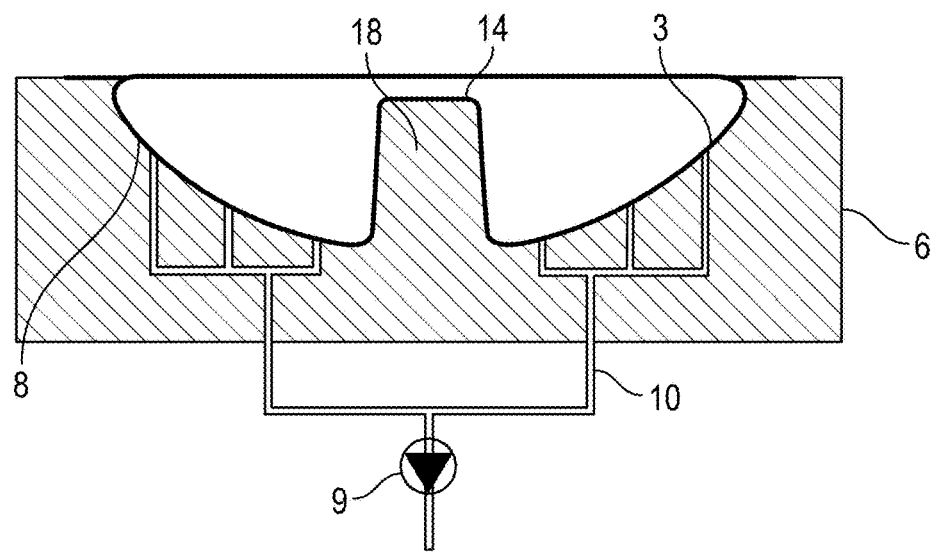
Figure 7:
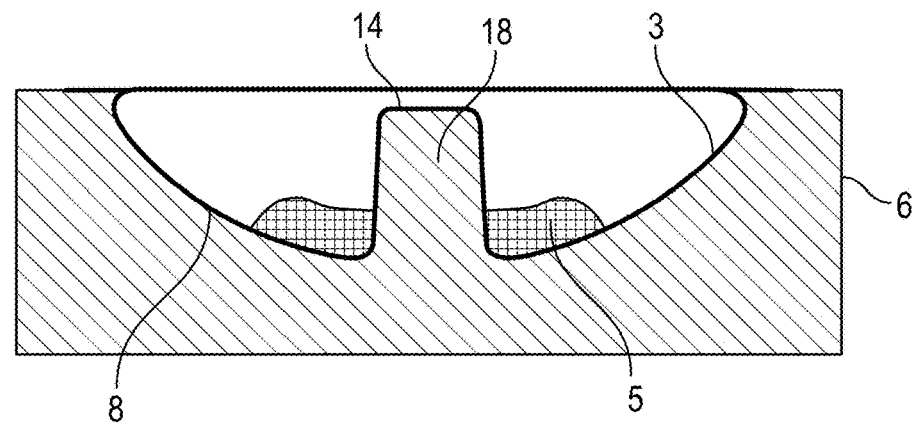
Figure 8:
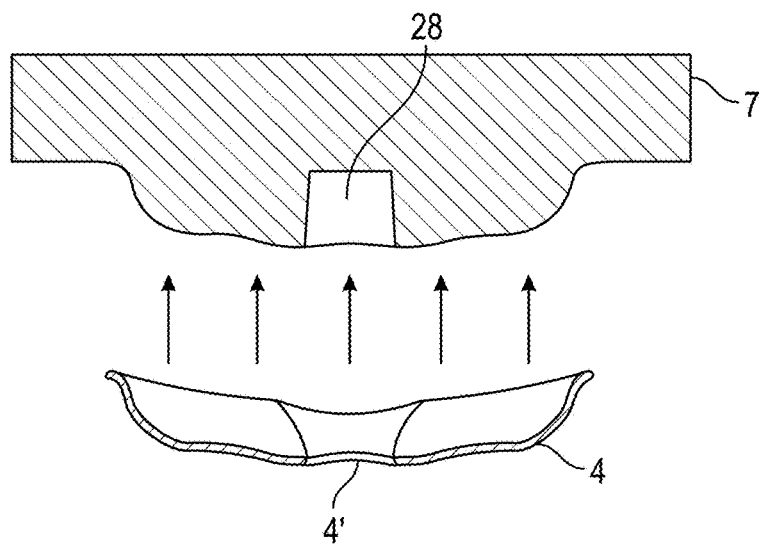
FIG. 8 shows a cross-sectional view of the mould used in the process referred to in the invention in the step when the hull is placed on said mould.
Figure 9:
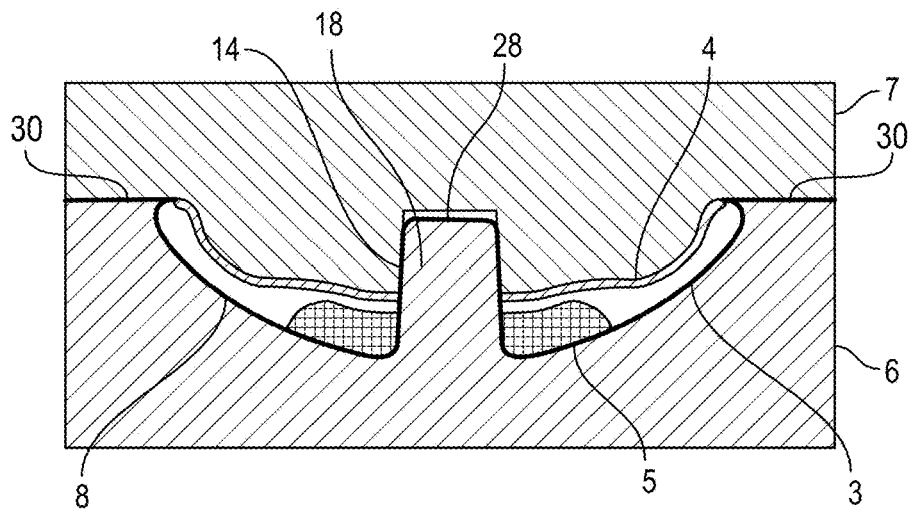
FIGS. 9, 10 and 11 show three different steps of the process referred to in the invention, in which the mould, the counter mould, the hull, the liner and the polyurethane present in the saddle referred to in the invention are shown.
Figure 10:
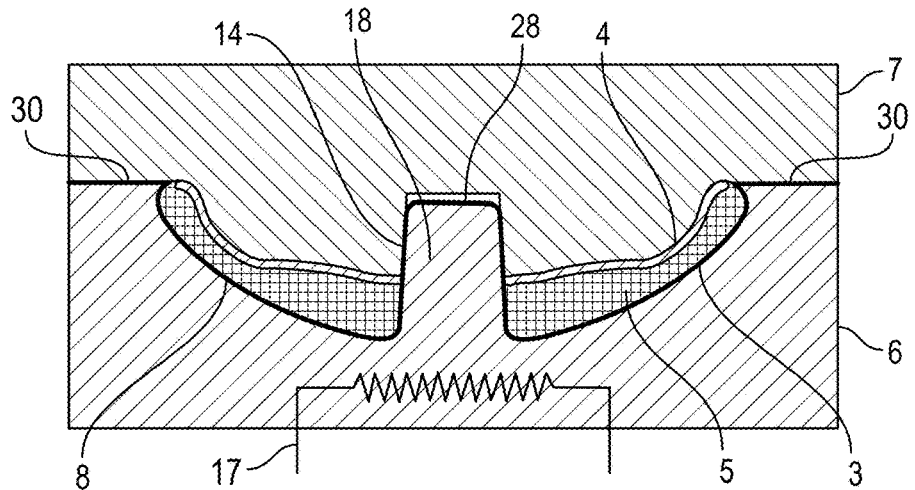
Figure 11:
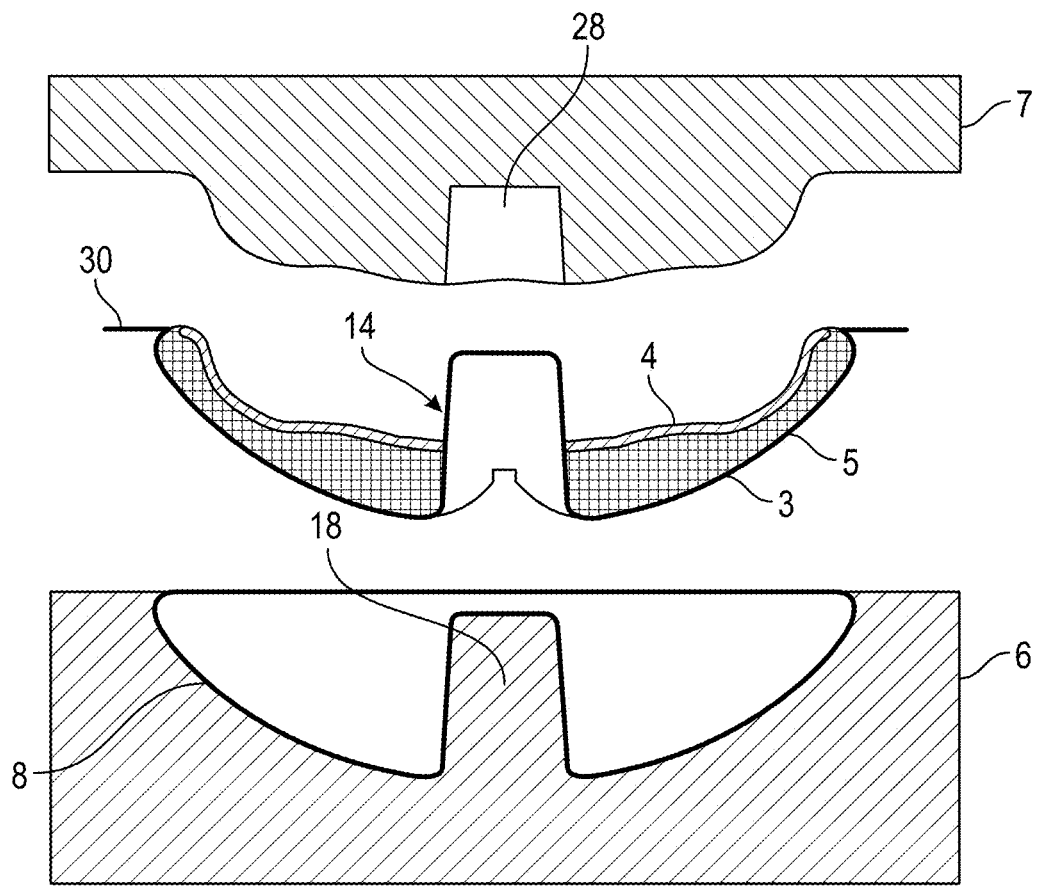

Once the aforementioned steps have been carried out, it will be sufficient to move the mould 106 away from the counter mould 107 to extract the substantially finished saddle (FIG. 3) in which, however, the central through channel is not yet present, since at this step there is still a part of the liner occupying the region intended for the central channel 102. It will therefore be necessary to cut this portion along the edges of the central channel 102 (FIG. 34) and it is precisely this cutting operation that inevitably leads to the creation of a bead 200 along the edge at which the union between the litter and the polyurethane takes place, which therefore remains visible in state-of-the-art saddles.

This bead 200 does not affect the technical performance of the saddle, but it is an aesthetic imperfection and is unpleasant to the touch, especially considering the fact that, as mentioned above, usually the saddles with, this central channel 102 are sold at a considerable price, being of particularly high quality.

Moreover, since said bead 200 is at the central channel 102, it might irritate or cause pain is to the sensitive parts of the perineal area of the user, which, due to the configuration of the saddle, are likely to be located in the channel 102 during use.

Said steps for manufacturing the saddle according to the invention can also be carried out with the mould 106 heated to a temperature of about 50° C.-60° C. by means of known type, schematically indicated with a resistor 117 (FIG. 32), so as to facilitate the perfect adhesions of the liner 103 to the hollow surface 108 of said mould 106.

Figure 1:
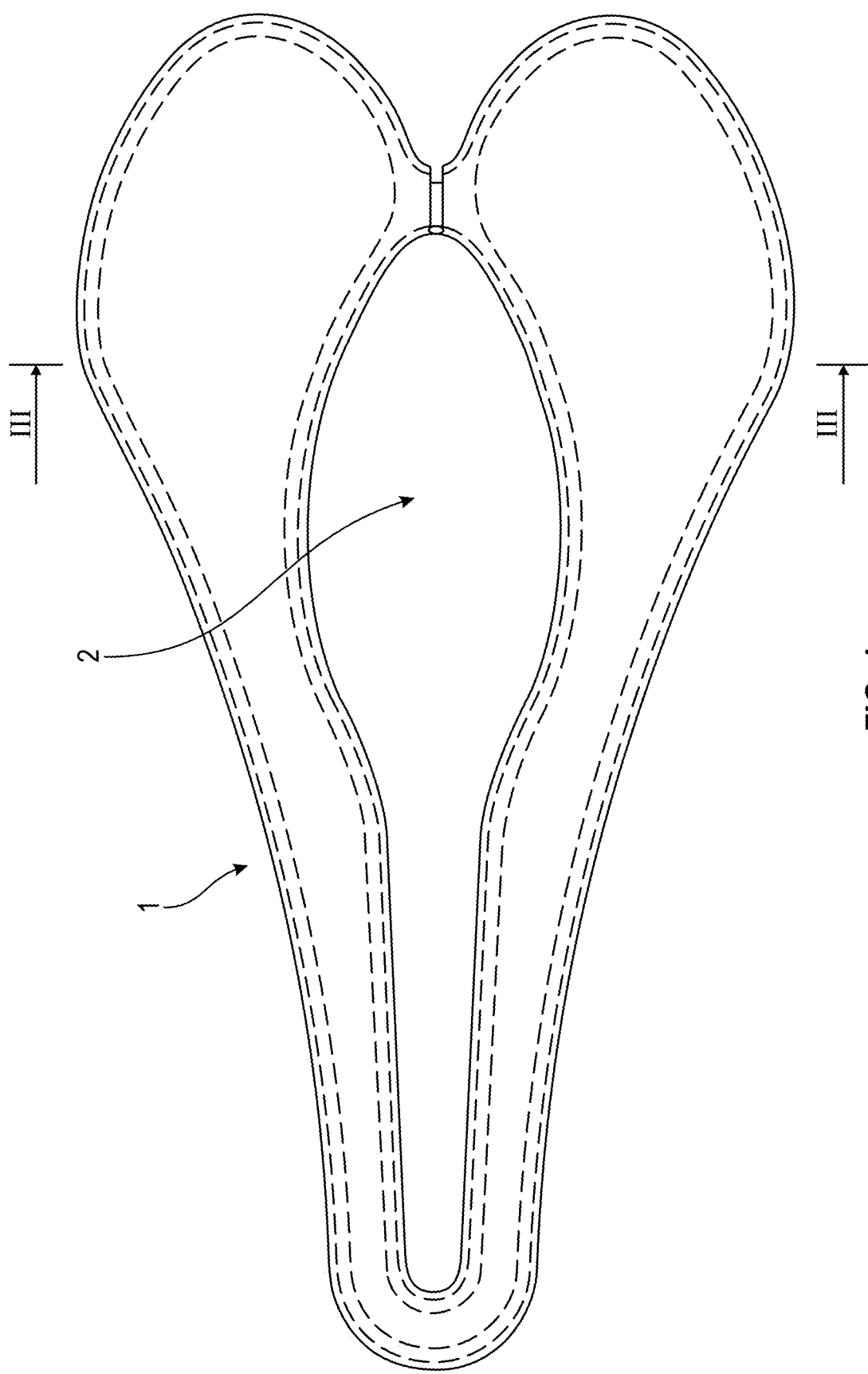
FIGS. 1 and 2 show, respectively, a plan view from above and a perspective view of a saddle manufactured according to the process referred to in the invention.
Figure 2:
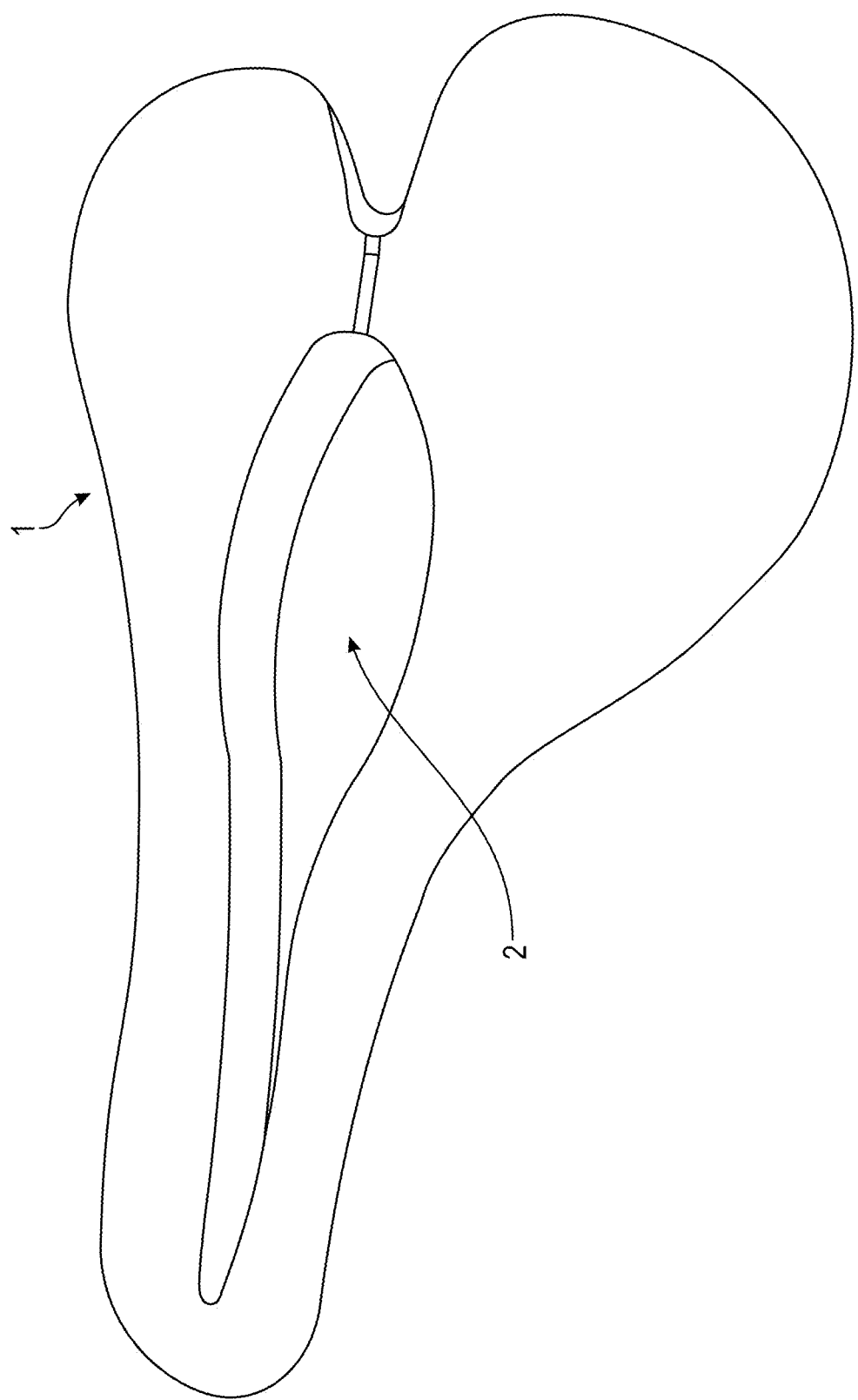
Figure 15:
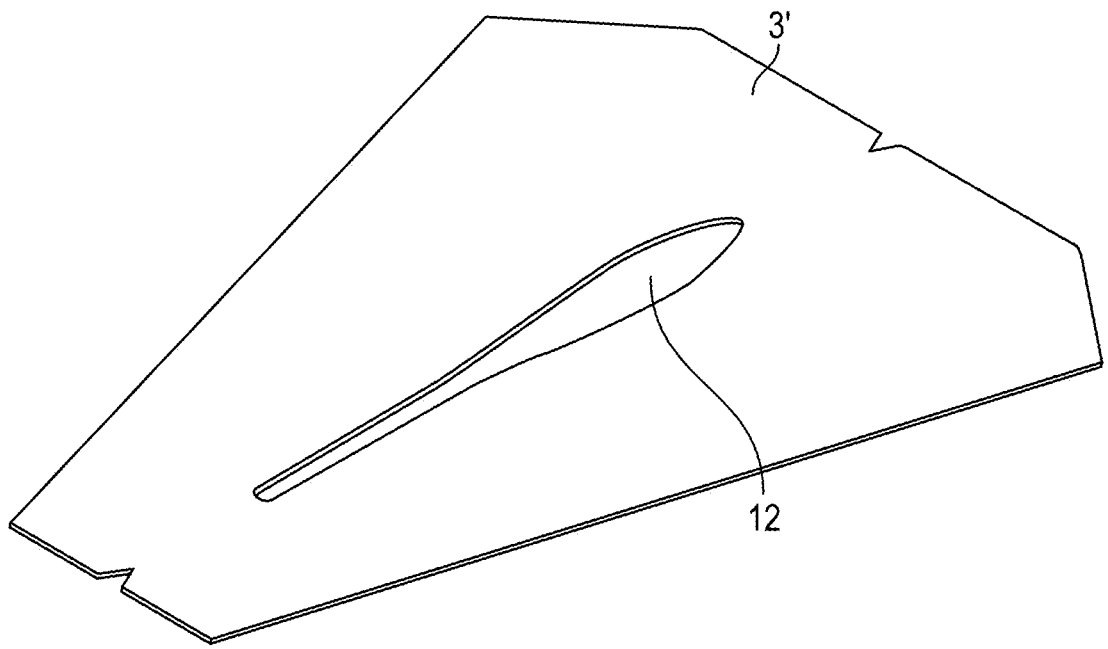
FIG. 15 shows an overall perspective view of the semi-finished liner used in the process referred to in the invention for manufacturing the saddle referred to in the invention, in one of its interim steps.
Figure 23:
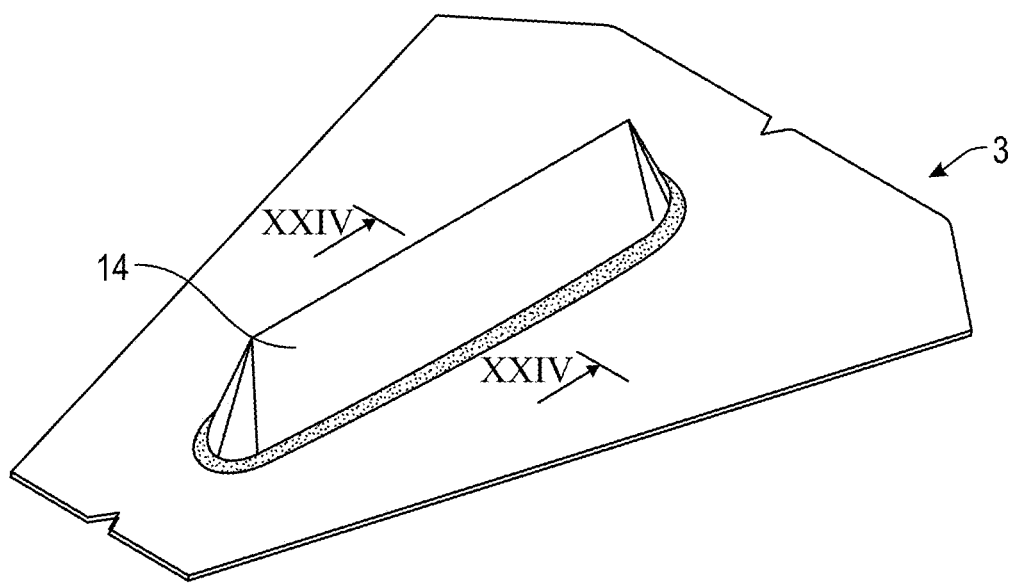
FIG. 23 shows an overall perspective view of the set made up of the liner and cap already welded thereto.

In order to eliminate said bead, it is necessary, according to the present invention, to use a liner 3 provided with a cap-like structure 14 (FIG. 23) positioned in the region which will be destined to be occupied by the through channel 2 (FIG. 1). The liner 3 comprising the cap-like structure 14 (FIG. 23) is obtained by the union a semi-finished liner 3' (FIG. 15) in which a hole 12 has been previously created in the region that will be placed at the central channel 2 (FIG. 1). Moreover, also the mould 6 and the counter mould 7 (FIGS. 5-11) will necessarily have respectively a projection 18 and a concavity 28 adapted to engage each other. In particular, the projection 18 and the concavity 28 have dimensions and shapes such as to allow the engagement of the projection 18 within the concavity 28, substantially to size.

Figure 12:
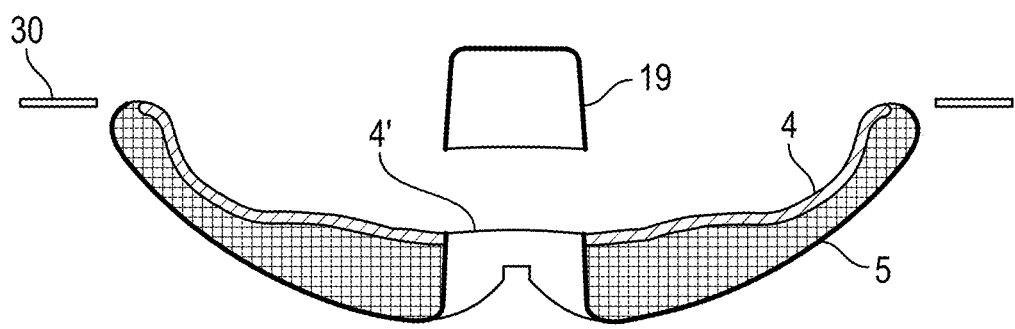
FIG. 12 shows a cross-sectional view of the saddle obtained by means of the process referred to in the invention, in which the step of cutting various portions to be eliminated for the complete finishing of the saddle is schematically shown.

As can be seen from FIGS. 5 to 12, the process according to the invention comprises the steps of:
arranging the set of the liner 3, comprising the cap-like structure 14, on the hollow surface 8 of the mould 6, taking care to arrange said cap-like structure 14 on the projection 18 (FIG. 5);
creating a vacuum between the liner 3 and the hollow surface S to allow a perfect adhesion between the aforesaid ones and the consequent perfect adhesion of the cap-like structure 14 to the projection 18, by using, for example, vacuum pumps 9, connected to the hollow surface 8 of the mould 6 by means of ducts 10 (FIG. 6);
pouring polyurethane 5 into the hollow surface 8 previously covered by the liner 3 (FIG. 7);
positioning the hull 4 on the surface of the counter mould 7, taking care to arrange the through hole 4' of said hull 4 at the concavity 28 of the counter mould 7 (FIG. 8);
mutual approaching and closing of the mould 6 and the counter mould 7 and consequent positioning the counter mould 7 at the hollow surface 8 of the mould 6 (FIG. 9) and reciprocal engagement of said projection 18 covered by the cap-like structure 14 with the concavity 28 of the counter mould 7, so that the cap-like structure 14 covering the projection 18 extends through the through hole 4' (FIGS. 8 and 12) of the hull 4 within said concavity 28 of the counter mould 7. It is implied that the dimensions of the projection 18 are such that they allow that, when the mould is dosed, the cap-like structure extends above the hull 4 (FIG. 5);
expansion of the polyurethane 5 (FIG. 10) until the space between the liner 3 and the hull 4 is completely filled;
mutual moving away of mould 6 and counter mould 7 at the end of the expansion of said polyurethane 5, after waiting for the necessary curing/polymerization time of said polyurethane and extraction of the set of hull 4, polyurethane 5 and liner 3 from mould 6 (FIG. 11);
mechanical removal of the portion 19 of the cap-like structure that covered the is projection 18 and that protrudes with respect to the edges of hole 4' of hull 4 (FIG. 12). A removal of the lateral excesses 30 of the portions of liner 3 which, located at the interface between mould and counter mould, did not occupy the hollow surface 8 of said mould 6 may also be provided.

The state of the art does not give any indication on how to industrially manufacture said is liner 3 provided with the cap-like structure 14.

Figure 16:
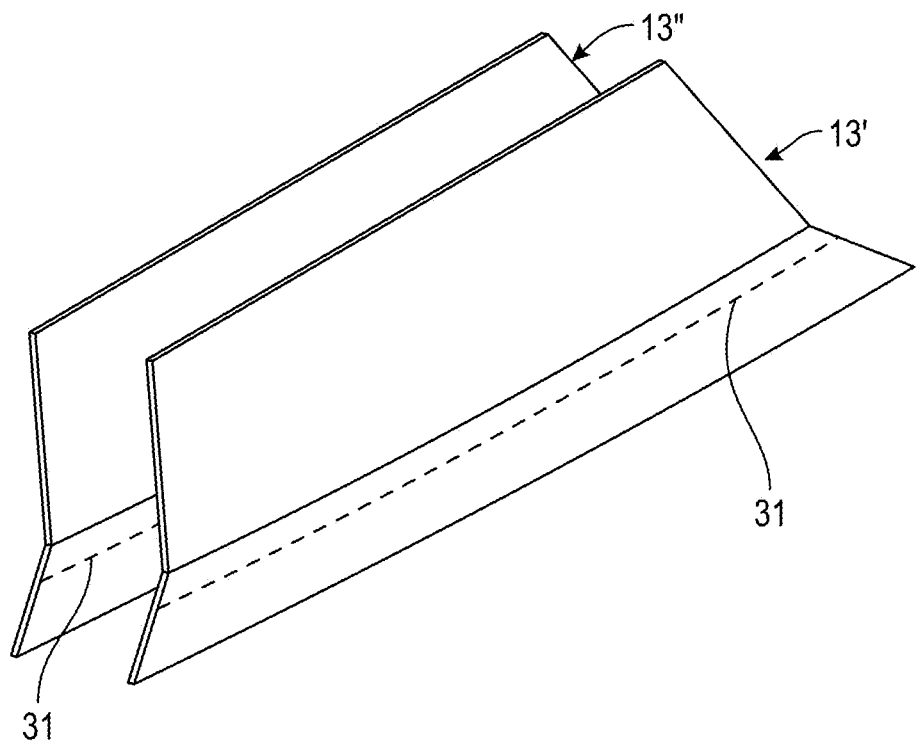
FIG. 16 shows two elements that will constitute the cap that will be used for the completion of the saddle referred to in the invention.
Figure 17:
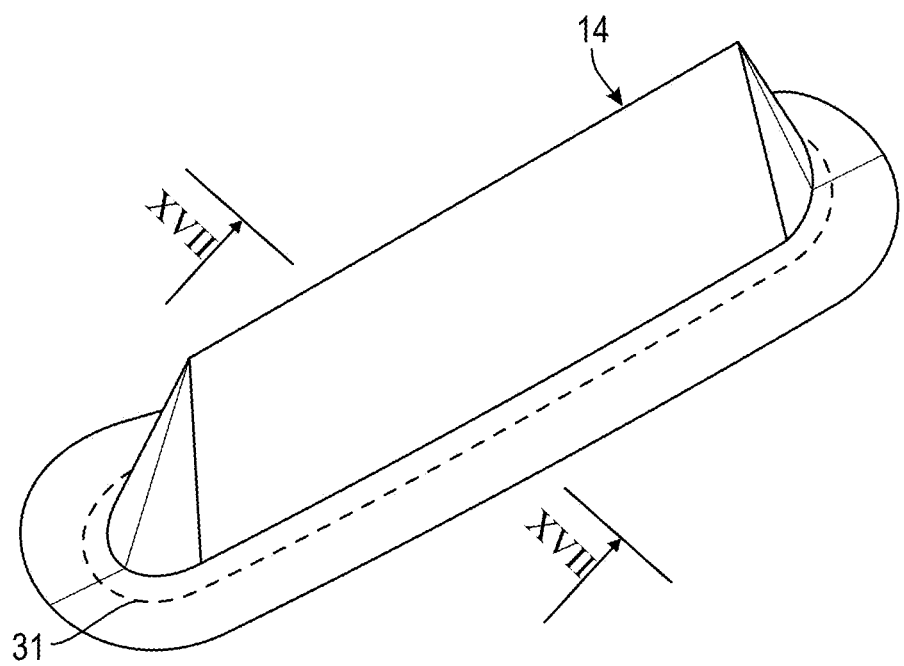
FIGS. 17 and 18 show, respectively, an overall perspective view and a frontal view of said cap.
Figure 18:
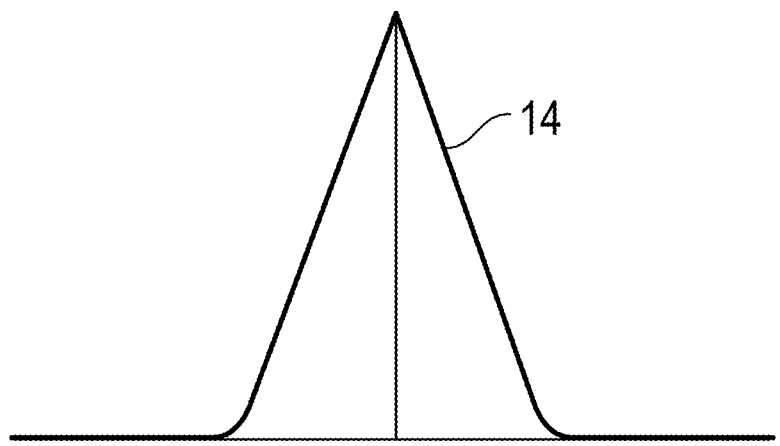
Figure 19:
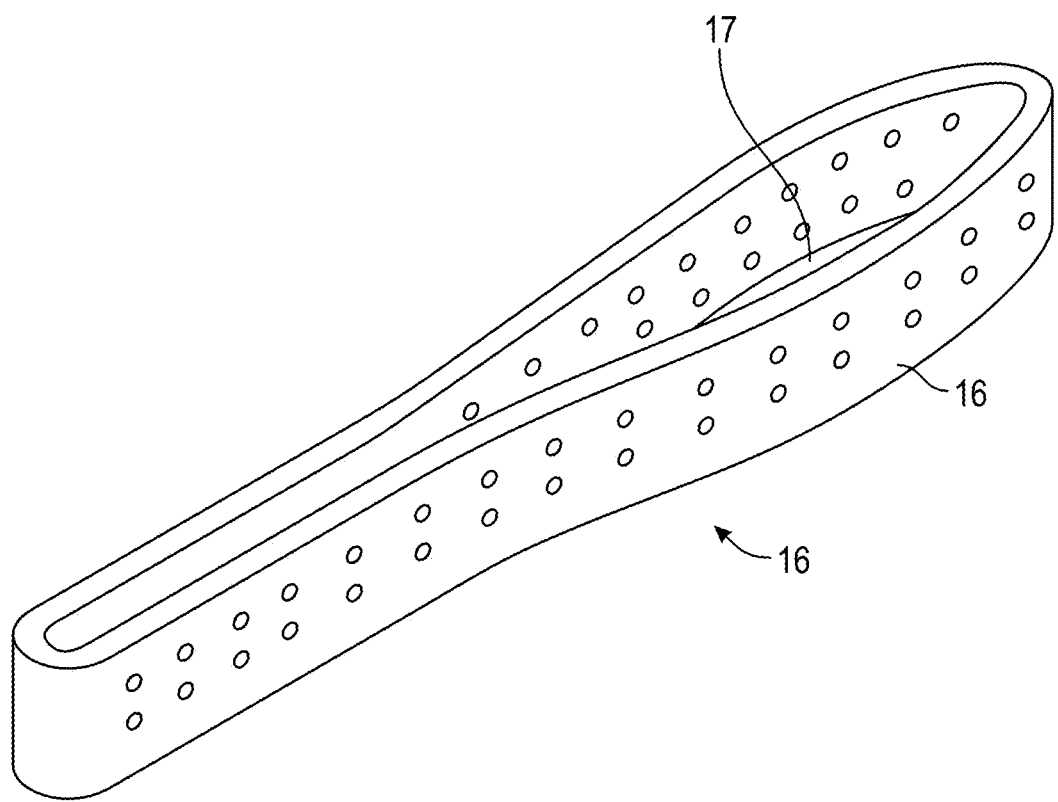
FIG. 19 shows an overall perspective view of an electrode used in the process referred to in the invention.
Figure 20:
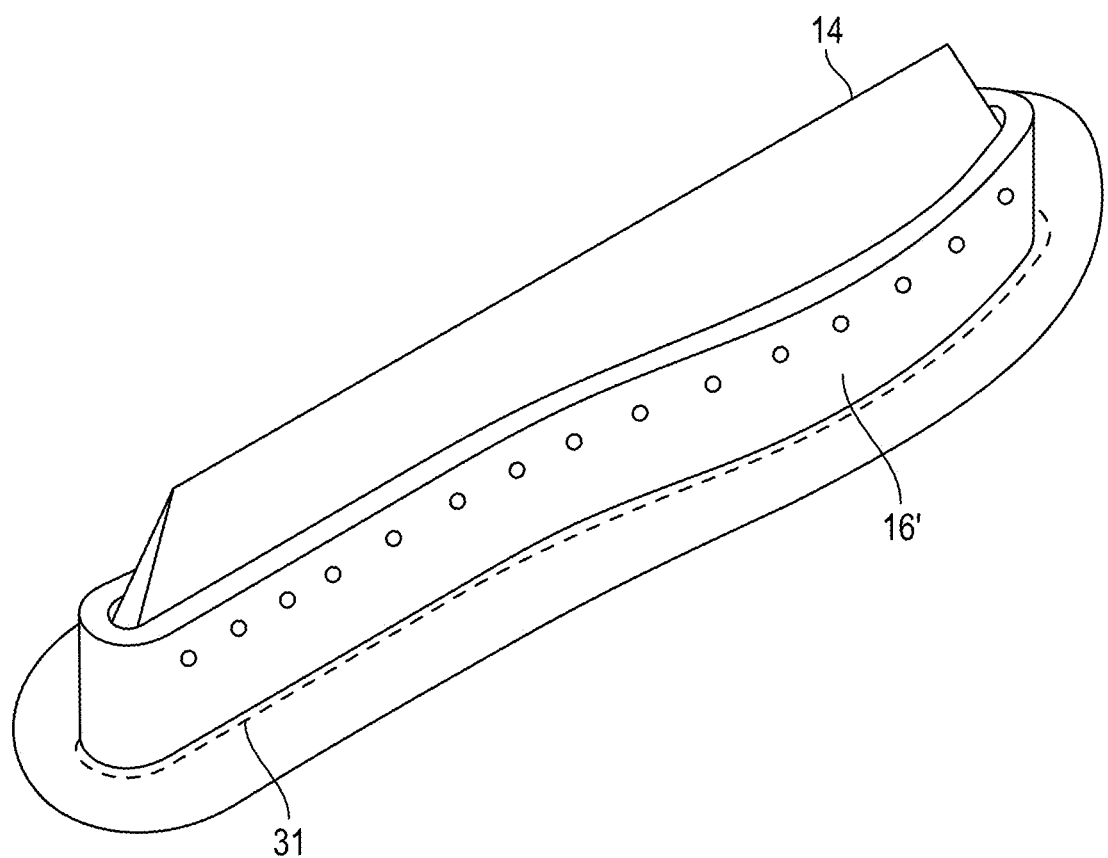
FIG. 20 shows an overall perspective view of said electrode in the step of folding a portion of the open base of the cap-like structure.
Figure 21:
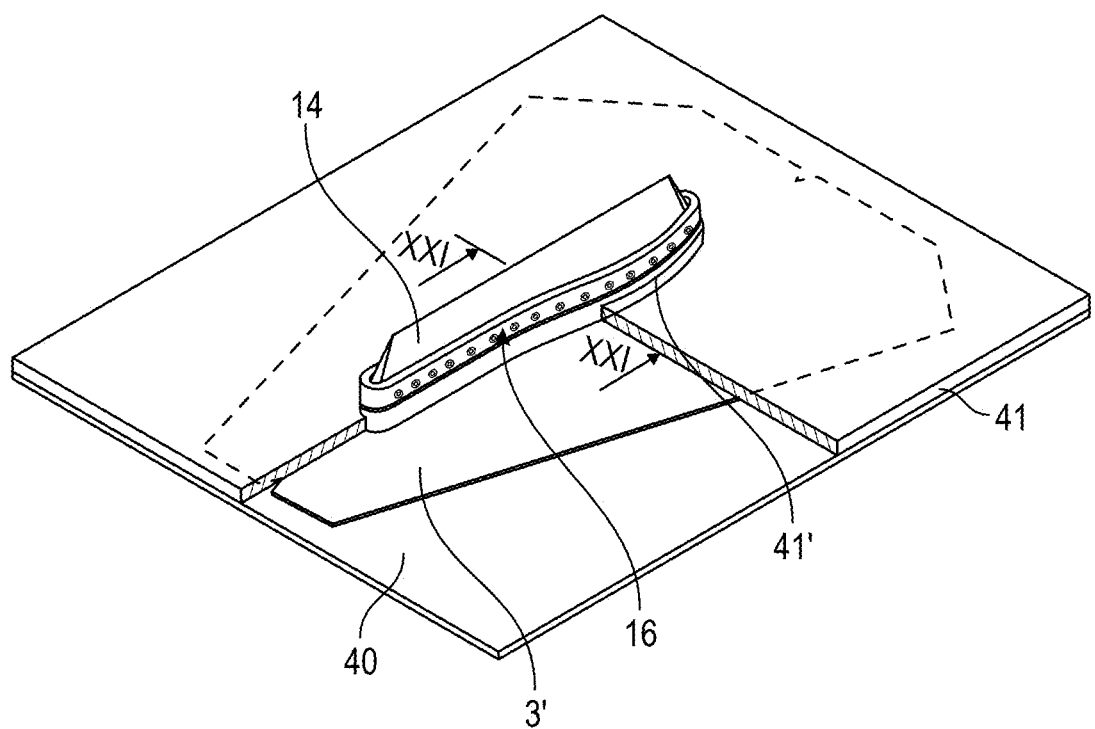
FIG. 21 shows an overall perspective view of how said electrode is applied to weld said cap to the liner inside a saddle referred to in the invention.
Figure 22:
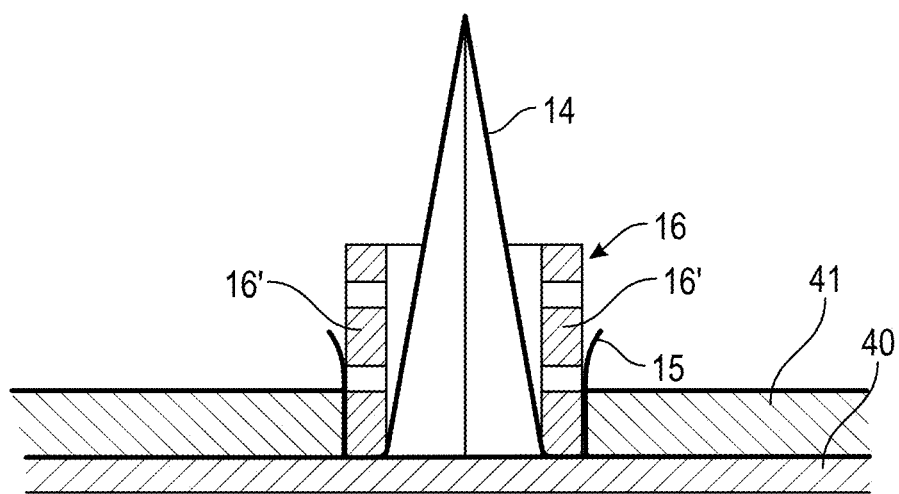
FIG. 22 shows a cross-sectional view of what is shown in FIG. 20, carried out according to lines XXI-XXI of said figure.
Figure 24:
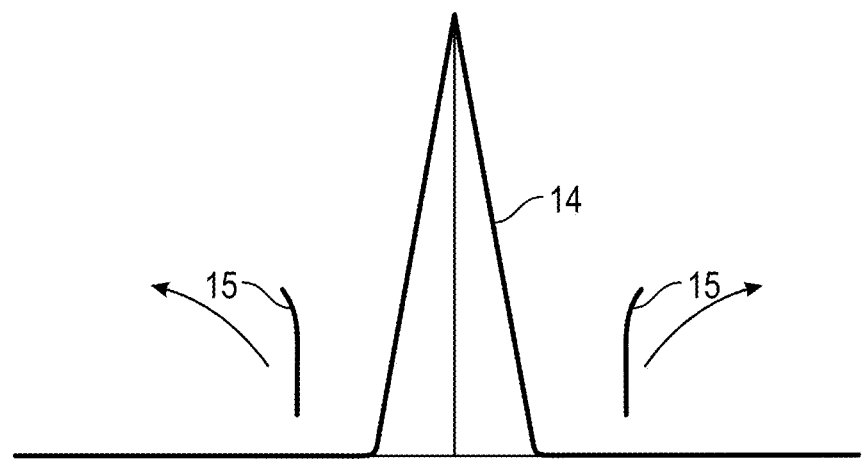
FIG. 24 shows a cross-sectional view of said set, carried out according to line XXIV-XXIV of FIG. 23, in which the excesses to be eliminated and that are formed during the process referred to in the invention are shown.
Figure 25:
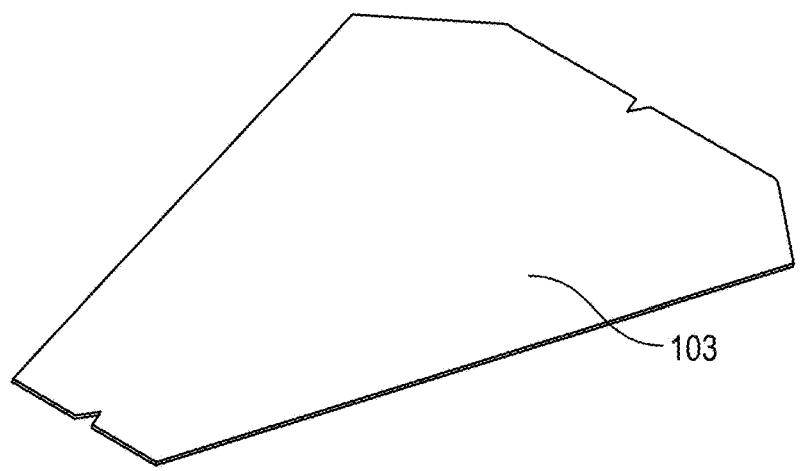
FIG. 25 shows an overall perspective view of a liner used to manufacture a saddle with a central channel according to the state of the art.

Advantageously, according to the invention, it can be manufactured by a process comprising the following steps:
creating a hole 12 on a semi-finished liner 3', at the region where the channel 2 of the saddle 1 will be present, once formed (FIG. 15);
reciprocal welding of two elements 13', 13" of substantially similar length to that of the hole 12, so as to form a cap-like structure 14 (FIGS. 16, 17 and 18);
micro-drilling 31 of the elements 13', 13" (FIGS. 16 and 17) along the edge of the area which will be intended to be folded over the external wall 16' of an electrode 16 (FIG. 19);
inserting the elements 13 ', 13" within the electrode and folding a portion of the wen base of the cap-like structure 14 and placing the aforesaid one against the external walls of the electrode 16 (FIG. 20);
arranging the assembly of electrode 16 and the cap-like structure 14 on the edges of the hole 12 (visible in FIG. 15) present in the liner;
actuating the electrode 16 which, by means of high frequency currents, will allow is a local fusion that will cause the adhesion between the portion of the cap-like structure 14 in contact with the liner and the same semi-finished liner 3' (FIGS. 21 and 22);
removing the electrode 16 (FIG. 23);
cutting the portion 15 of the cap-like structure 14 which was placed against the is external surface of the electrode 16 (FIG. 24).

The adhesion step between the cap-like structure 14 and the semi-finished liner 3' may also be carried out by performing a welding with cladding.

This process can be advantageously carried out by using a work surface 40 (FIGS. 21 and 22) on which the semi-finished liner 3' presenting the hole 12 (visible in FIG. 15) is to be placed, so as to stretch it completely and keep it in a perfectly flat position, and a locking surface 41 (FIG. 21) presenting a hole 41' (FIG. 21) in the region corresponding to the hole 12 (visible in FIG. 15) of the liner. The electrode 16 in which the cap-like structure 14 has been applied will be inserted in said hole 41'. The locking surface 41 causes the immobilization of the semi-finished liner 3' during the welding step of the cap, so as to avoid movements that might compromise the structural quality of the final assembly.

The invention claimed is:

1. PROCESS FOR MANUFACTURING A BICYCLE SADDLE, which provides a central through channel and which has:
a hull with a through hole at the central through channel of the saddle;
a polyurethane layer as a padding element;
a liner adapted to cover the polyurethane layer, said process providing for the following steps:

arranging the liner on the hollow surface of a mould;
creating a vacuum between the liner and said hollow surface to allow adhesion between the liner and the hollow surface;
pouring polyurethane into said hollow surface;
positioning the hull on the surface of a counter mould;
moving the mould towards the counter mould and consequent positioning of the counter mould at the hollow surface of the mould;
expansion of the polyurethane, which completely fills the space between the liner and the hull;
moving the mould away from the counter mould;
extraction of the hull, the polyurethane, and the liner of the mould, wherein said liner is subjected to a previous processing step so as to present a cap-like structure at a region in which the channel of the saddle will be present once formed and in that the step of arranging the liner presenting the cap-like structure on the mould takes place taking care to arrange said cap-like structure on a projection provided in said mould, wherein the projection is adapted to engage with a concave portion of said counter-mould;
said process wherein, at the end of all the previous steps, a portion of the cap-like structure on the projection and which protrudes above edges of the hole of the hull is removed and said liner is made by the following steps:
creating a hole on a semi-finished liner, at the region where the channel of the saddle will be present, once formed;
-welding of a cap-like structure to the semi-finished liner at the hole, so that open edges of the cap-like structure coincide substantially with the edges of the hole.

2. PROCESS, according to claim 1, wherein said cap-like structure is obtained by means of a previous step of mutual welding of two elements, of a length substantially similar to that of the hole.

3. PROCESS, according to claim 2, wherein it provides for:
inserting the cap-like structure into a through hole present in an electrode, substantially shaped like the hole present on the liner;
inserting the elements within the electrode and folding a portion of an open base of the cap-like structure and placing a portion of the cap-like structure against an external walls of the electrode;
arranging the assembly of the electrode and the cap-like structure on the edges of the hole present in the semi-finished liner;
performing a welding to cause an adhesion by mutual fusion between the portion of the cap-like structure in contact with the semi-finished liner and the liner;
removing the electrode;
cutting the portion of the cap-like structure which was placed against the external surface of the electrode, so as to facilitate the removal of the portion of the cap-like structure which was placed against the external surface of the electrode.

4. PROCESS, according to claim 3, wherein a high frequency welding is performed using the electrode to cause the adhesion by mutual fusion between the portion of the cap-like structure in contact with the semi-finished liner and the liner.

5. PROCESS, according to claim 3, wherein it provides a welding with cladding to cause the adhesion by mutual fusion between the portion of the cap-like structure in contact with the semi-finished liner and the liner.

6. PROCESS, according to claim 3, wherein the two elements adapted to form the cap-like structure are subjected to a micro-drilling step along the edge of the area intended to be folded on the external wall of the electrode.

7. BICYCLE SADDLE, according to claim 3, wherein the liner is positioned flat on a work surface as well as blocked by a locking surface having a hole in the region corresponding to the hole of the semi-finished liner.

8. BICYCLE SADDLE, wherein it is made by means of the process according to claim 1.

* * * * *